United States Patent
Bellinson

[11] Patent Number: 6,098,993
[45] Date of Patent: Aug. 8, 2000

[54] ATTACHMENT FOR A BABY STROLLER

[76] Inventor: James L. Bellinson, 242 Aspen, Birmingham, Mich. 48009

[21] Appl. No.: 09/120,570

[22] Filed: Jul. 22, 1998

[51] Int. Cl.[7] ........................................................ B62B 7/04
[52] U.S. Cl. ........................ 280/1.5; 280/47.11; 280/79.2
[58] Field of Search .................................. 280/1.5, 47.11, 280/47.131, 47.38, 79.2, 638, 642, 647, 650, 87.01; 224/184

[56] References Cited

U.S. PATENT DOCUMENTS

| | | | |
|---|---|---|---|
| 1,234,871 | 9/1917 | Caw | 280/1.5 |
| 1,876,963 | 9/1932 | Klass | 280/47.38 |
| 2,365,174 | 12/1944 | Cochran | 280/1.5 |
| 2,647,343 | 8/1953 | Zileri et al. | 280/47.11 |
| 3,328,043 | 6/1967 | Johnson | 280/1.5 |
| 4,236,723 | 12/1980 | Lemmon | 280/1.5 |
| 4,848,780 | 7/1989 | Straub | 280/1.5 |
| 5,062,651 | 11/1991 | Varieur | 280/1.5 |
| 5,090,714 | 2/1992 | Seekins et al. | 280/1.5 |
| 5,375,861 | 12/1994 | Gifford | 280/47.38 |
| 5,511,802 | 4/1996 | Aitken | 280/1.5 |
| 5,536,033 | 7/1996 | Hinkston | 280/650 |
| 5,653,455 | 8/1997 | Richards | 280/1.5 |
| 5,884,920 | 3/1999 | Seto | 280/1.5 |

FOREIGN PATENT DOCUMENTS

| | | | |
|---|---|---|---|
| 3807449 | 9/1989 | Germany | 280/1.5 |

*Primary Examiner*—Daniel G. DePumpo
*Assistant Examiner*—F. B. Vanaman
*Attorney, Agent, or Firm*—Gifford, Krass, Groh, Sprinkle, Anderson & Citkowski, P.C.

[57] ABSTRACT

An attachment for a baby stroller of the type having a frame, an elongated transverse for a handle and wheels for rollably supporting the frame to a ground surface which enables the baby stroller to be propelled while jogging. The attachment includes a belt releasibly secured around the waist of the user and first and second elongated push bars. Each push bar has one end secured to the belt and their other end secured to opposite ends of the baby stroller handle so that, while jogging, the user propels the baby stroller through the belt and push bars. The baby stroller is steered by the user exerting a greater force on one push bar than the other.

8 Claims, 3 Drawing Sheets

ATTACHMENT FOR A BABY STROLLER

BACKGROUND OF THE INVENTION

I. Field of the Invention

The present invention relates to an attachment for a baby stroller which allows the baby stroller to be propelled while jogging, as well as a jogging baby stroller itself.

II. Description of the Prior Art

There are a number of commercially available baby jogging strollers which are designed to be propelled by a user while jogging or walking (hereinafter collectively referred to as "jogging" or "jogging stroller"). These jogging strollers typically comprise a frame having wheels which rollably support the frame on the ground surface. An elongated transverse bar extends across the rear of the jogging stroller. This handle is gripped by the jogger while jogging in order to propel the stroller.

A primary disadvantage of these previously known jogging strollers, however, is that since the jogger must grip the stroller handle with his or her hands, the jogger cannot maintain the normal jogging stride, i.e. with the arms swinging by the sides of the jogger.

In order to enable the jogger to maintain his or her normal jogging stride, there have been a number of previously known jogging strollers in which the stroller is attached to the waist of the user by a belt. Examples of these types of jogging strollers are shown in U.S. Pat. No. 4,848,780 to Straub, U.S. Pat. No. 5,375,861 to Gifford and U.S. Pat. No. 5,511,802 to Aitken.

One disadvantage of these previously known baby strollers, however, is that only a single bar extended between the belt worn around the user's waist and the baby stroller itself. This in turn made it difficult to steer the baby stroller while jogging.

SUMMARY OF THE PRESENT INVENTION

The present invention provides an attachment for a jogging baby stroller, as well as the jogging baby stroller itself, which overcomes all of the above-mentioned disadvantages of the previously known devices.

In brief, the attachment of the present invention is designed for use with a jogging baby stroller of the type having a frame, an elongated transverse rear handle and wheels which rollably support the frame to the ground support surface. Any conventional baby seat is mounted to and carried by the frame.

The attachment comprises a belt which is releasibly secured around the waist of the user, and first and second elongated push bars. One end of each push bar is secured to the belt while the opposite ends of the push bars are secured to the opposite sides of the rear handle of the frame. Furthermore, the space in between the push bars at their attachment with the handle is substantially greater than the space in between the ends of the push bars at their attachment with the user's belt.

In use, the jogger propels the stroller through the push bars while maintaining a normal jogging stride. In order to steer the stroller in a left or right direction, the jogger merely exerts a greater force on the push bar on the side of the stroller opposite from the direction in which the stroller is to be propelled. For example, in order to turn the stroller in a right-hand direction, the jogger exerts a greater force on the left push bar, and vice versa.

A primary advantage of Applicant's invention is that, as an attachment, it can be easily adapted to existing jogging strollers.

A still further advantage is that, since the user's hands are no longer required to propel the stroller, the user's hands are free to assume a normal jogging swing or for other purposes.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
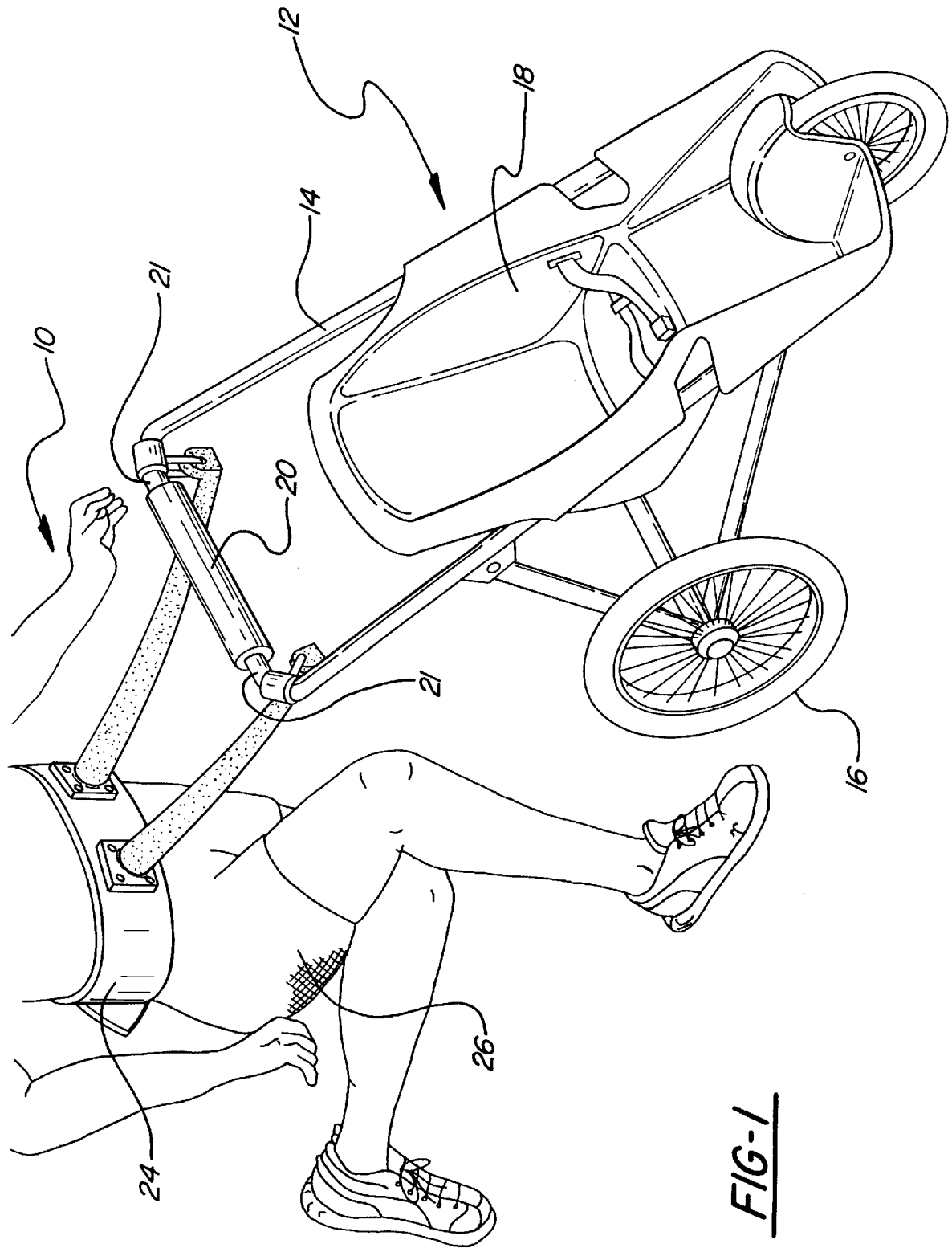
FIG. 1 is a perspective view illustrating a preferred embodiment of the present invention.

With reference first to FIG. 1, the attachment 10 of the present invention is there shown for use with a jogging stroller 12. The jogging stroller 12 is conventional in construction and includes a frame 14 having wheels 16 which rollably support the frame 14 to a ground support surface. A baby seat 18 is carried by the frame 14 while a rear handle 20 having laterally spaced portions 21 is provided for propelling the baby stroller 12. The rear handle 20 can comprise an elongated bar as shown in the drawing, or can comprise other types of handles having laterally spaced portions 21.

Figure 2:
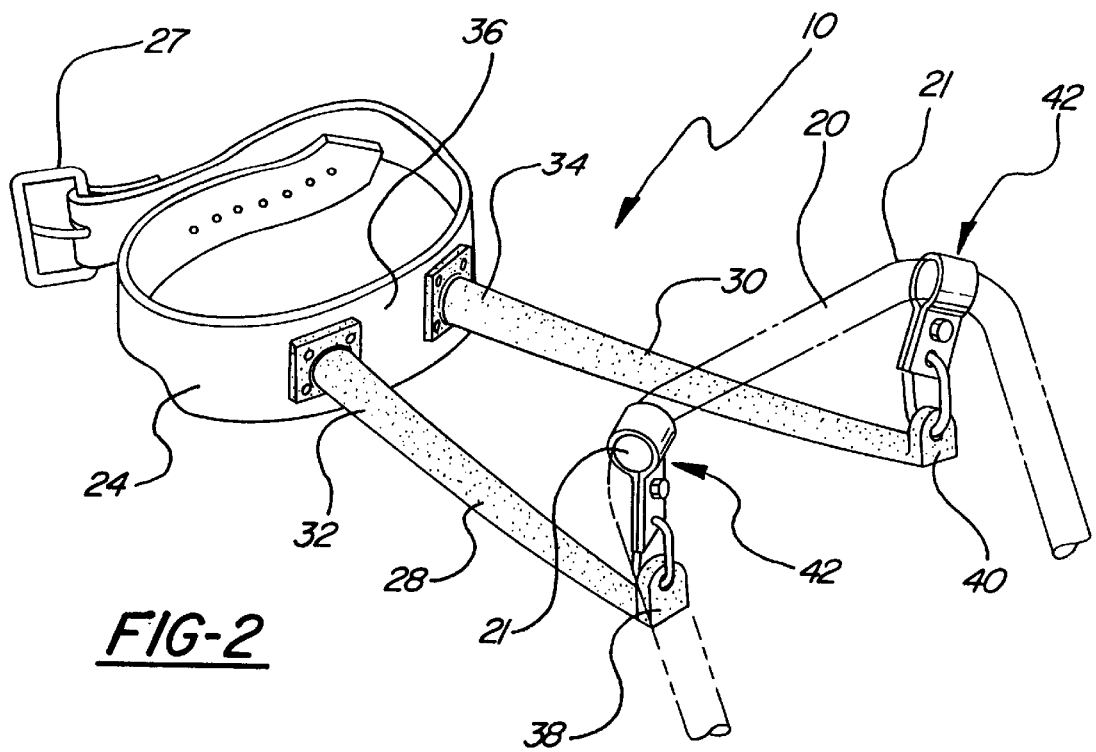
FIG. 2 is a perspective view of the preferred embodiment of the invention.

With reference now to FIGS. 1 and 2, the attachment 10 of the present invention comprises a belt 24 which is releasibly secured around the waist of a jogger 26 (FIG. 1). Any conventional means, such as a buckle 27, can be used to adjust the overall length of the belt 24 to insure a snug fit of the belt 24 around the jogger's waist.

As best shown in FIG. 2, the attachment 10 further comprises a first and second elongated push bar 28 and 30. The push bars 28 and 30 each have a first end 32 and 34, respectively, secured to a front 36 of the belt 24 by any conventional means. In doing so, the push bars 28 and 30 extend forwardly and generally horizontally from the belt 24.

Still referring to FIG. 2, the other ends 38 and 40 of the push bars 28 and 30, respectively, are secured to the laterally spaced portions 21 of the stroller rear handle 20 by a clamp assembly 42. Furthermore, the spacing between the clamp assemblies 42, and thus the ends 38 and 40 of the push bars 28 and 30, is greater than the spacing between the other ends 32 and 34 of the push bars 28 and 30 for a reason to be subsequently described.

Figure 3:
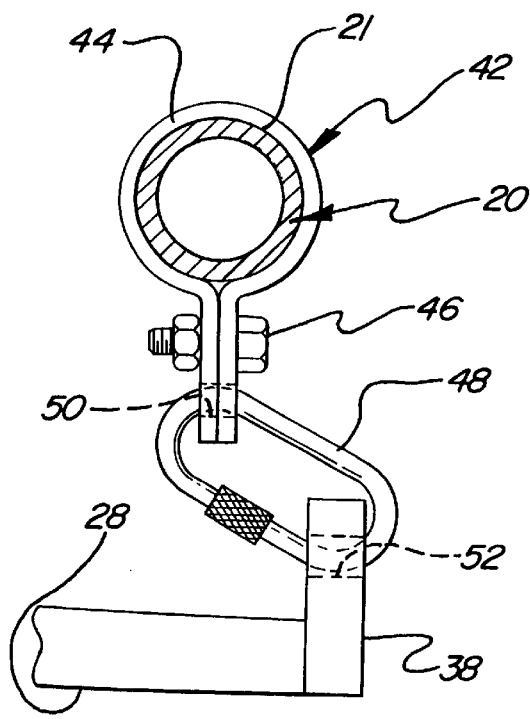
FIG. 3 is a fragmentary view showing a portion of the present invention.
Figure 4:
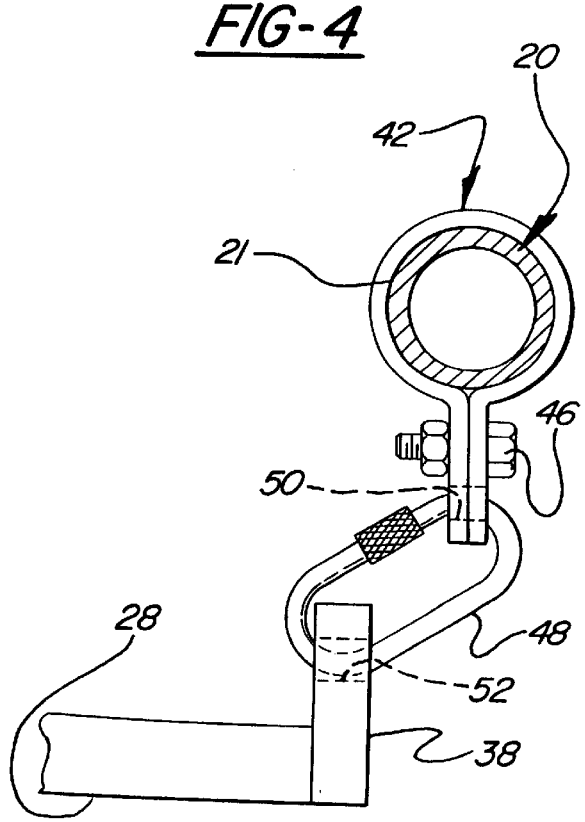
FIG. 4 is a fragmentary view showing a further portion of the present invention.

With reference now to FIGS. 3 and 4, the clamp assembly 42 for securing the first push bar 28 is there shown in greater detail, it being understood that a substantially identical clamp assembly 42 is also used for securing the end 40 of the second push bar 30 to the portion 21 of the handle 20. The clamp assembly 42 includes a band 44 which extends around the stroller handle 20 and is rigidly secured to the handle 20 by a bolt and nut assembly 46. A rigid closed loop link 48 then connects the end 38 of the push bar 28 to the band 44 by extending through openings 50 in the band 44 and an opening 52 at the end 38 of the push bar 28.

Still referring to FIGS. 3 and 4, since the link 48 is loosely contained within the bores 50 and 52 in the band 44 and push bar 28, respectively, the loose link 48 provides an effective relative length adjustment for the push bar 28 between its attachment to the baby stroller handle 20 and the belt 24. FIG. 3 illustrates the push bar 28 with its effective length between the handle 20 and belt 24 at a minimum while, conversely, FIG. 4 illustrates the push bar 28 in a position in which its effective length between the handle 20 and the belt 24 is maximized.

Figure 6:
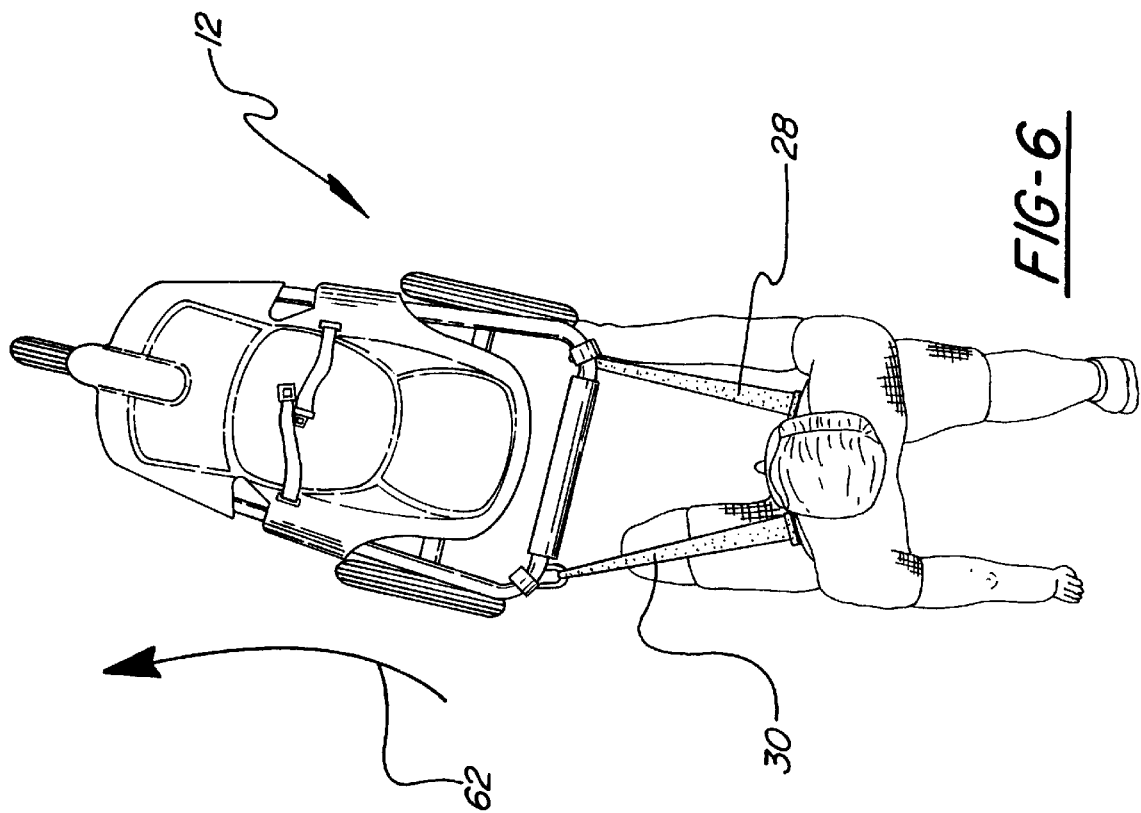
FIG. 6 is a view similar to FIG. 5 but illustrating the baby stroller steered in a left-hand direction.
Figure 5:
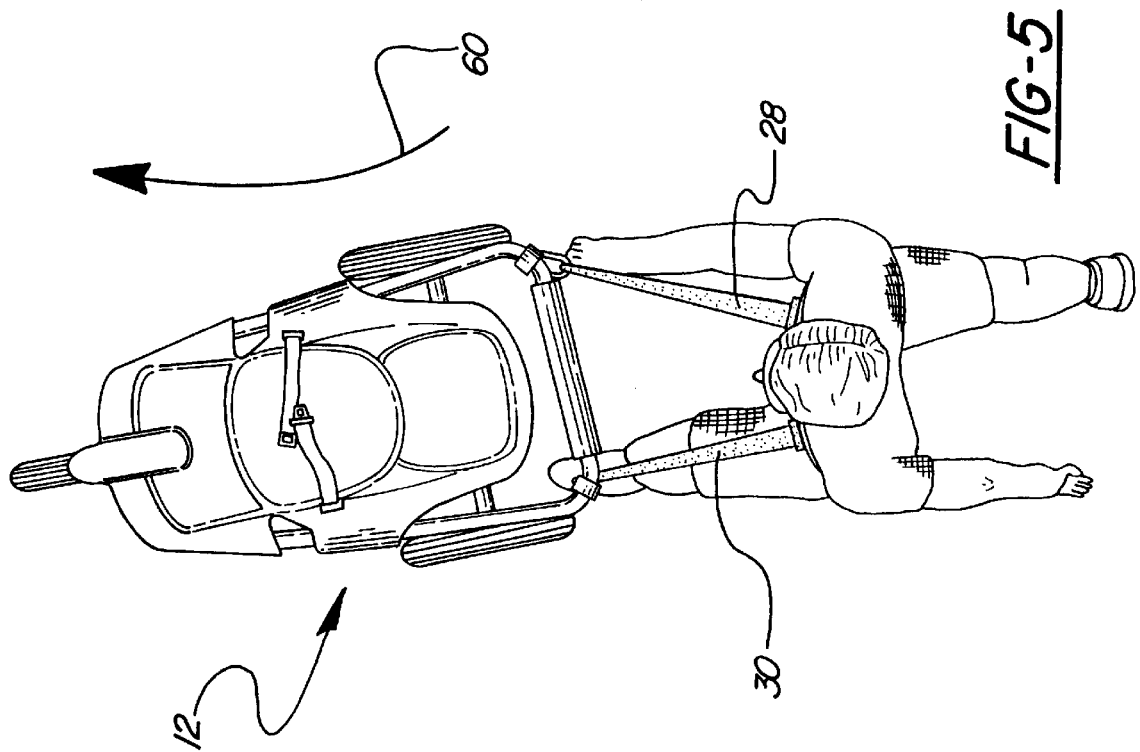
FIG. 5 is a top view illustrating the baby stroller steered in a right-hand direction.

With reference now to FIGS. 5 and 6, the operation of the attachment of the present invention will be now described. With the attachment secured to both the jogger and the stroller 12 in the previously described fashion, in order to steer the stroller in a right-hand direction as indicated by arrow 60 (FIG. 5), the jogger exerts a greater forward force on the left-hand push bar 30 by moving towards the left side of the stroller 12. In doing so, the effective length of the push bar 30 is minimized (FIG. 3) while the effective length of the right-hand push bar 28 is maximized (FIG. 4). Thus, a greater force is exerted between the jogger and the baby stroller 12 via the push bar 30 than the push bar 28. This in turn propels the stroller 12 in a right-hand direction.

FIG. 6 illustrates the stroller 12 being steered in a left-hand turn as illustrated by arrow 62. In order to turn the stroller to the left, the jogger moves to the right of the stroller thus effectively shortening the length of the push bar 28 and lengthening the effective length of the push bar 30. In doing so, a greater force is applied from the jogger to the baby stroller 12 through the push bar 28 thus turning the stroller 28 in a left direction.

Although the present invention is preferably in the form of an attachment which can be adapted to existing baby strollers, alternatively, the present invention can be sold in conjunction with the entire stroller.

Having described my invention, however, many modifications thereto will become apparent to those skilled in the art to which it pertains without deviation from the spirit of the invention as defined by the scope of the appended claims.

I claim:

1. An attachment for a baby stroller having a frame with a rear handle having a first and second laterally spaced end portions, and wheels for rollably supporting the frame to a ground surface, said attachment comprising:

a belt adapted to be releasibly secured around the waist of a user, a first and second elongated push bar, means for securing one end of said first push bar to said belt, means for securing the other end of said first push bar to the first end portion of the rear handle, means for securing one end of said second push bar to said belt, and means for securing the other end of said second push bar to the second end portion of the rear handle wherein said means for securing said other ends of said push bars to said handle each comprises a loose link which provides a continuous length adjustment between said belt and the attachment of said push bars to the handle during use of the attachment to thereby enable lateral movement of said belt relative to the handle during use of the attachment.

2. The invention as defined in claim 1 wherein the spacing between said other ends of said push bars is greater than the spacing between said one ends of said push bars.

3. The invention as defined in claim 1 and comprising a pair of clamps, said clamps adapted to be secured adjacent opposite ends of the handle, one loose link connecting one clamp to said other end of said first push bar, and the other loose link connecting the other clamp to said other end of said second push bar.

4. The invention as defined in claim 1 wherein each push bar is constructed of a rigid material.

5. A jogging stroller comprising:

a frame with an elongated transverse rear handle having a first and second end, wheels for rollably supporting the frame to a ground surface, a belt adapted to be releasibly secured around the waist of a user, a first and second elongated push bar, means for securing one end of said first push bar to said belt, means for securing the other end of said first push bar to the rear handle adjacent the first end of the rear handle, means for securing one end of said second push bar to said belt, and means for securing the other end of said second push bar to the rear handle adjacent the second end of the rear handle wherein said means for securing said other ends of said push bars to said handle each comprises a loose link which provides a continuous length adjustment between said belt and the attachment of said push bars to said handle during use of the stroller to thereby enable lateral movement of said belt relative to said handle during use of the stroller.

6. The invention as defined in claim 5 wherein the spacing between said other ends of said push bars is greater than the spacing between said one ends of said push bars.

7. The invention as defined in claim 5 wherein each push bar is constructed of a rigid material.

8. The invention as defined in claim 5 and comprising a pair of clamps, said clamps being secured adjacent opposite ends of the handle, one loose link connecting one clamp to said other end of said first push bar, and the other loose link connecting the other clamp to said other end of said second push bar.

* * * * *